US008930893B2

(12) United States Patent
Ogasawara

(10) Patent No.: US 8,930,893 B2
(45) Date of Patent: Jan. 6, 2015

(54) INITIALIZATION SAFETY

(75) Inventor: Takeshi Ogasawara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 13/536,270

(22) Filed: Jun. 28, 2012

(65) Prior Publication Data
US 2014/0007046 A1 Jan. 2, 2014

(51) Int. Cl.
G06F 15/16 (2006.01)
G06F 17/30 (2006.01)
G06F 13/28 (2006.01)
G06F 13/00 (2006.01)
G06F 9/44 (2006.01)

(52) U.S. Cl.
USPC ............ 717/110; 707/999.008; 711/147; 717/104; 717/118; 717/124

(58) Field of Classification Search
CPC ........... G06F 7/785; G06F 9/52; G06F 9/465; G06F 9/526; G06F 9/544; G06F 9/30032; G06F 11/3632; G06F 11/3664; G06F 11/3684; G06F 11/3688; G06F 17/30348; G06F 21/54
See application file for complete search history.

(56) References Cited

U.S. PATENT DOCUMENTS

| 7,209,918 B2 * | 4/2007 | Li ........................... 707/999.008 |
| 7,389,291 B1 * | 6/2008 | Shavit et al. ........... 707/999.008 |
| 2001/0047361 A1 * | 11/2001 | Martin et al. ................. 707/100 |
| 2001/0056420 A1 * | 12/2001 | Steele et al. .................. 707/100 |
| 2004/0059733 A1 * | 3/2004 | Li .................................... 707/8 |
| 2005/0076083 A1 | 4/2005 | Congdon et al. |
| 2005/0198045 A1 * | 9/2005 | Wu et al. ....................... 707/100 |
| 2006/0161737 A1 * | 7/2006 | Martin et al. ................. 711/147 |
| 2006/0161897 A1 * | 7/2006 | Biberstein et al. ............ 717/124 |
| 2007/0168951 A1 * | 7/2007 | Vollmann et al. ............. 717/118 |
| 2009/0019525 A1 * | 1/2009 | Yu et al. ........................ 717/104 |
| 2009/0037891 A1 | 2/2009 | Wang |
| 2009/0125548 A1 | 5/2009 | Moir et al. |
| 2012/0197921 A1 * | 8/2012 | Mineno ......................... 707/758 |

FOREIGN PATENT DOCUMENTS

JP          09190349 t       7/1997

* cited by examiner

Primary Examiner — Don Wong
Assistant Examiner — Anibal Rivera
(74) Attorney, Agent, or Firm — Cantor Colburn LLP; Vazken Alexanian

(57) ABSTRACT

Embodiments of the disclosure are directed to inserting a declaration of a non-overwritable variable pointing to a current object in a source code, and inserting a code of storing a value referencing the current object to the non-overwritable variable. Embodiments of the disclosure are directed to converting a source code to generate a shared object in a lock-free mode by inserting a declaration of a non-overwritable variable pointing to a current object in the source code, and inserting a code of storing a value referencing the current object to the non-overwritable variable.

15 Claims, 4 Drawing Sheets

```
class MyClass {
  int value;
  MyClass next;
  final Object self;
  MyClass(int v, MyClass n) {
    value = v;
    next = n;
    self = this;
  }
}
```

FIG. 2

INITIALIZATION SAFETY

BACKGROUND

The present disclosure relates generally to initialization, and more specifically, to an improved initialization safety in Java.

Concurrent threads or processes might not have visibility with respect to a latest value assigned to, or associated with, a field. For example, a compiler and a central processing unit (CPU) adhering to the Java Language Specification (JLS) might reorder instructions and their executions. A reordering of instructions might not guarantee that the latest value would be visible.

An approach to ensuring visibility of a field of a new object at the completion of a constructor is a memory fence. As an example, a so-called "final" attribute may be associated with a shared field. However, a field designated as final cannot be modified. To effectively achieve modification of the value, a new object would need to be created to replace the initial object/field designated as final. The creation of the new object results in a penalty in terms of overhead due to garbage collection of the initial object/field. As another example, a so-called "volatile" attribute may be associated with a shared field. However, use of a volatile field results in a penalty in terms of the reading of the volatile field, which is required to adhere to the JLS.

BRIEF SUMMARY

According to one or more embodiments of the present disclosure, an apparatus comprises at least one processor, and memory storing instructions that, when executed by the at least one processor, cause the apparatus to insert a declaration of a non-overwritable variable pointing to a current object in a source code, and insert a code of storing a value referencing the current object to the non-overwritable variable.

According to one or more embodiments of the present disclosure, a computer program product comprises a non-transitory computer readable storage medium having computer readable program code stored thereon that, when executed by a computer, performs a method for converting a source code to generate a shared object in a lock-free mode, the method comprising inserting a declaration of a non-overwritable variable pointing to a current object in the source code, and inserting a code of storing a value referencing the current object to the non-overwritable variable.

According to one or more embodiments of the present disclosure, a system comprises at least one processor configured to execute a plurality of threads, where each thread of the plurality of threads is configured to access an object in a lock-free mode based on an insertion of a declaration of a non-overwritable variable pointing to a current object in a source code and a storage of a value referencing the current object to the non-overwritable variable.

According to one or more embodiments of the present disclosure, a method comprises inserting a declaration of a non-overwritable variable pointing to a current object in a source code, and inserting a code of storing a value referencing the current object to the non-overwritable variable.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the disclosure are apparent from the following detailed description taken in conjunction with the accompanying drawings in which:

FIG. 2 illustrates an exemplary class in accordance with one or more aspects of this disclosure.

DETAILED DESCRIPTION

Figure 1:
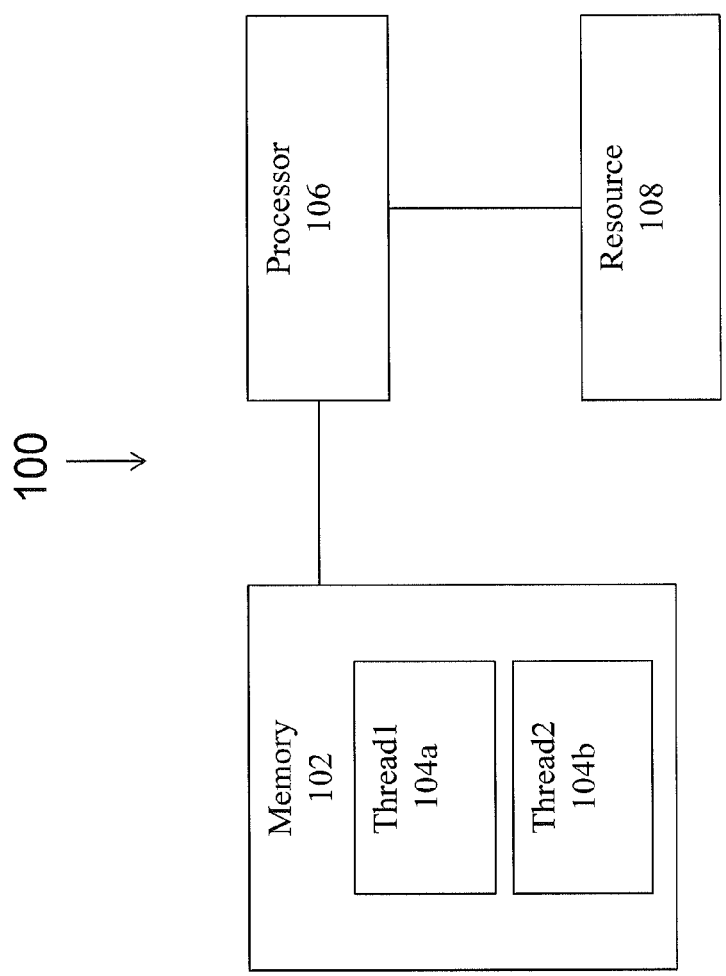
FIG. 1 is a schematic block diagram illustrating an exemplary system architecture in accordance with one or more aspects of this disclosure.

In accordance with various aspects of the disclosure, visibility to one or more variables pointed to by a "final" field may be ensured, potentially in addition to the final field itself.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

Referring to FIG. 1, an exemplary system architecture 100 is shown. The architecture 100 is shown as including a memory 102. The memory 102 may store executable instructions. The executable instructions may be stored or organized in any manner. As an example, at least a portion of the instructions are shown in FIG. 1 as being associated with a number of threads, such as a first thread 104a and a second thread 104b. The instructions stored in the memory 102 may be executed by one or more processors, such as a processor 106.

The threads 104a and 104b may be associated with a resource 108. For example, the resource 108 may include one or more blocks, objects, or fields. The threads 104a and 104b may access the resource 108 concurrently (e.g., concurrently in terms of time or space), such that the resource 108 may be, or include, a shared resource.

If the resource 108 is not properly managed or established, a value (e.g., a latest value) associated with the resource 108 might not be visible. As an example, if a Java Virtual Machine (JVM) or a first thread (e.g., the thread 104a) allocates a block of the resource 108 and zero-clears it, and then a constructor sets a value (e.g., a value of '1') to the block, a second process or thread (e.g., the thread 104b) might not see the latest value (e.g., '1'). For example, the second process or thread might see the zero-cleared value for the block.

In order to address the lack of visibility with respect to the latest value associated with the resource 108, a "final" field may be inserted in, or associated with, an object and a pointer may be set to the object itself at the end of a constructor. An example is shown in FIG. 2. In FIG. 2, a class called "MyClass" is denoted. The MyClass class includes exemplary fields or variables "value" and "next," neither of which are declared as being "volatile" or "final." Also included in the MyClass class of FIG. 2 is a field called "self," which has an attribute of "final." The "MyClass" constructor assigns 'v' to value and 'n' to next. The MyClass constructor also assigns, via the execution of the statement "self=this", a pointer to the newly created object (e.g., the object being referenced, or this object). A compiler and JVM may make the contents of an object visible by completion of a constructor to adhere to JLS (section 17.5), which therefore ensures the visibility of the variables pointed to by a "final" field (e.g., value and next in FIG. 2), as well as the "final" field itself.

Figure 3:
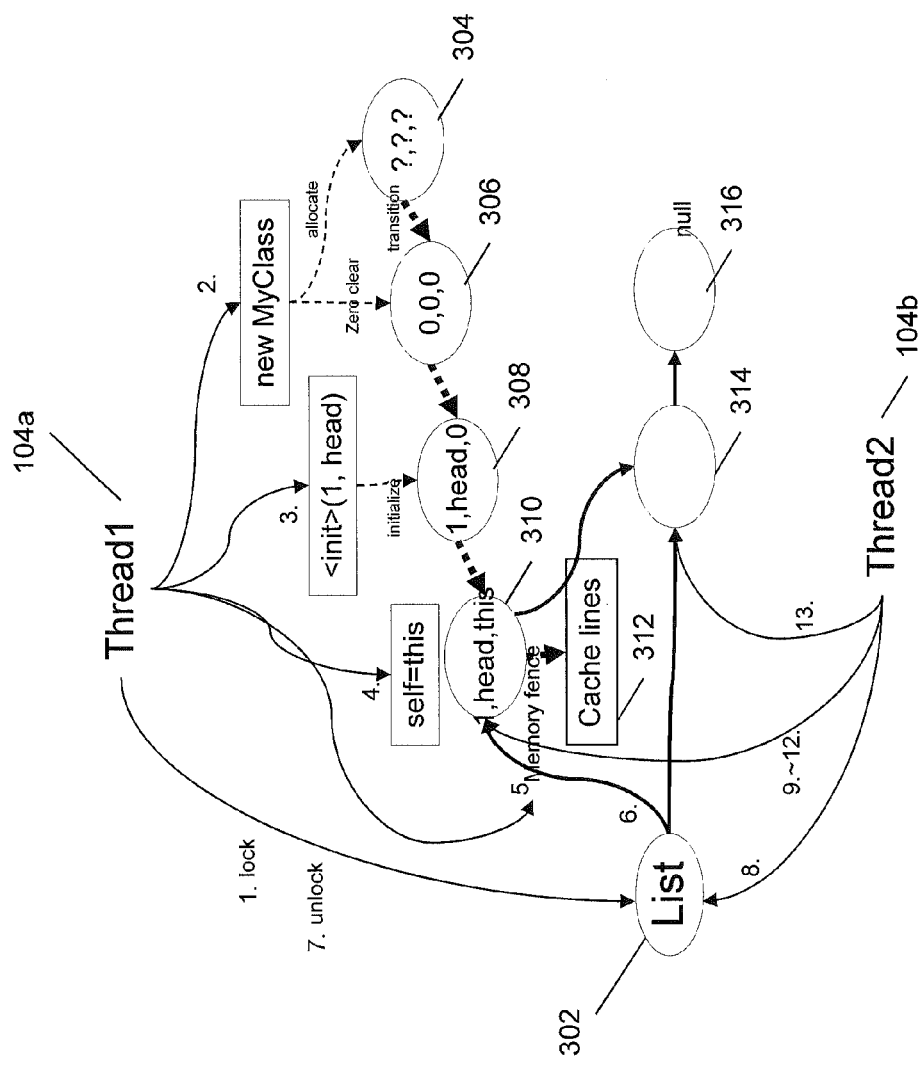
FIG. 3 illustrates an exemplary state diagram in accordance with one or more aspects of this disclosure.

FIG. 3 illustrates an exemplary state diagram. In the example shown, a first thread (e.g., the thread 104a of FIG. 1) inserts a node to a list 302 while a second thread (e.g., the thread 104b of FIG. 1) searches the list 302 for a particular node. In this regard, the list 302 may be referred to as a shared list since it may be accessed by more than one process or thread. In some embodiments, the list 302 may correspond to, or be included in, the resource 108 of FIG. 1.

In event 1, the thread 104a may acquire a lock of the list 302.

In event 2, the thread 104a may create a new object, S. The new object S may be created in accordance with the "MyClass" class described above in connection with FIG. 2. In this regard, as shown in a bubble 304, three variables or fields may be allocated, corresponding to "value", "next", and "self" in reference to FIG. 2. As part of event 2, the three variables or fields may be zero-cleared as shown in a bubble 306.

In event 3, the thread 104a may execute constructor code for the object S. The constructor code may provide initialization values for one or more of the variables or fields. For example, as shown in a bubble 308, "value" may be set equal to '1' and "next" be set equal to 'head', which may correspond to the start or beginning of the list 302.

In event 4, the thread 104a may execute an assignment corresponding to "self=this." As shown in a bubble 310, the "self" variable or field is updated relative to its corresponding initialization or zero-value in the bubble 308.

In event 5, the thread 104a may commit all of the changes done by the constructor to a memory hierarchy.

In event 6, the thread 104a may put the object S to the head of the list 302. The commitment of the changes to the memory hierarchy (event 5) and/or the placement of the object S at the head of the list (event 6) may be analogous to a memory fence with respect to a memory, such as a cache 312.

In event 7, the thread 104a may release the lock that was imposed in connection with event 1.

In event 8, the thread 104b may obtain an object S' from the list 302. In some embodiments, the object S' may correspond to the object S.

In event 9, the thread 104b may read a field of S'.

In event 10, the thread 104b may finish if the read field of S' in event 9 corresponds to a target field. Otherwise, the thread 104b may read the "next" field of S' in event 11 to obtain a neighboring node in the list 302 as part of event 12. In event 13, the neighboring node may be read, as shown via a bubble 314.

One or more of event 9-13 may repeat until the read field of S' corresponds to a target field (e.g., event 10), or until the "next" field of S' (e.g., event 11, corresponding to a bubble 316) has a 'null' value, indicating that no additional nodes are present.

Figure 4:
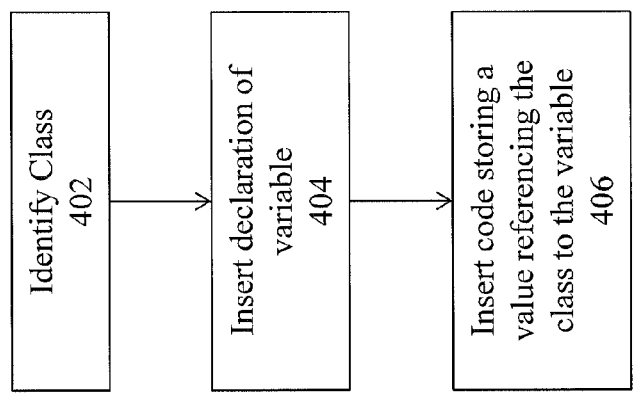
FIG. 4 is a flow diagram illustrating an exemplary method in accordance with one or more aspects of this disclosure.

FIG. 4 illustrates a method that may be used to convert source code to generate one or more shared objects. The source code may be associated with one or more formats of a target program to be modified. For example, in some embodiments changes may be made in bytecode. The one or more shared objects may be accessed in a lock-free mode.

In block 402, a class may be identified or defined to generate a shared object in the source code. As part of block 402, a tool or other mechanism may be employed to identify the class. The identification may be based on a frequency of use, a run-time instance profile, or any other factor or condition.

In block 404, a declaration of a non-overwritable variable pointing to the class or object itself may be inserted in the source code.

In block 406, code configured to store a value to the non-overwritable variable may be inserted, where the value may reference the class or object.

It will be appreciated that the events of the state diagram of FIG. 3 and the method of FIG. 4 are illustrative in nature. In some embodiments, one or more of the operations or events (or a portion thereof) may be optional. In some embodiments, one or more additional operations not shown may be included. In some embodiments, the operations may execute in an order or sequence different from what is shown in FIG. 3 and/or FIG. 4. In some embodiments, operations of FIG. 3 and FIG. 4 may be combined to obtain a variation on the state diagram and method depicted in FIG. 3 and FIG. 4, respectively.

Embodiments of the disclosure may be implemented independent of a platform type. For example, embodiments may be implemented independent of a JVM platform, optionally so long as the JVM platform satisfies the JLS. In some embodiments, a lock-free algorithm may be written that may work on any JVM without requiring customization of specific JVMs.

Aspects of the disclosure provide for contents of an initialized object to be committed. In this regard, a fine-grained tuning of combinations of field attributes might not occur.

In some embodiments, an algorithm may modify a shared field that may be accessible by multiple threads without locking (e.g., without locking when traversing the field or an associated node). In this regard, an object might not be created simply to modify the field, which may be the case when using a "final" type or attribute for the field. As such, garbage collection costs may be mitigated or eliminated. The algorithm may access a shared field without incurring a penalty associated with (extra) memory latency, which may be the case when using a "volatile" type or attribute for such a field.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations.

As will be appreciated by one skilled in the art, aspects of this disclosure may be embodied as a system, method or computer program product. Accordingly, aspects of the present disclosure make take the form of an entirely hardware embodiment, an entirely software embodiment (including firmware, resident software, micro-code, etc.) or an embodiments combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming language, including an object oriented programming language such as Java, Smalltalk, C++ or the like and conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, an apparatus or system may comprise at least one processor, and memory storing instructions that, when executed by the at least one processor, cause the apparatus or system to perform one or more methodological acts as described herein. In some embodiments, the memory may store data, such as one or more data structures, metadata, etc.

Embodiments of the disclosure may be tied to particular machines. For example, in some embodiments one or more devices may convert a source code to generate one or more shared objects that may be accessed in a lock-free mode. In some embodiments, the one or more devices may include a computing device, such as a personal computer, a laptop computer, a mobile device (e.g., a smartphones), a server, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There may be many variations to the diagram or the steps (or operations) described therein without departing from the spirit of the disclosure. For instance, the steps may be performed in a differing order or steps may be added, deleted or modified. All of these variations are considered a part of the disclosure.

It will be understood that those skilled in the art, both now and in the future, may make various improvements and enhancements which fall within the scope of the claims which follow.

What is claimed is:

1. A system, comprising:
   at least one processor configured to execute a plurality of threads, where each thread of the plurality of threads is configured to access an object in a lock-free mode based on an insertion of a declaration of a non-overwritable variable pointing to a current object in a source code and a storage of a value referencing the current object to the non-overwritable variable;
   wherein a first thread of the plurality of threads, when executed by the at least one processor, causes the system to:
   lock a shared list;
   allocate the object;
   modify a value of the object; and
   put the object corresponding to the modified value at a head of the shared list.

2. The system of claim 1, wherein the first thread, when executed by the at least one processor, causes the system to:
   release the lock of the shared list subsequent to putting the object corresponding to the modified value at the head of the shared list.

3. The system of claim 1, wherein a second thread of the plurality of threads, when executed by the at least one processor, causes the system to:
   obtain a second object from the shared list without a lock, and
   read a field of the second object.

4. The system of claim 3, wherein the second thread, when executed by the at least one processor, causes the system to:
   determine that the read field of the second object does not match a target value, and
   responsive to determining that the read field of the second object does not match the target value, read a second field of the second object to obtain a neighbor node.

5. The system of claim 3, wherein the second thread, when executed by the at least one processor, causes the system to:
   determine that the read field of the second object matches a target value, and
   finish a search responsive to determining that the read field of the second object matches the target value.

6. A computer implemented method, comprising:
executing, by at least one processor, a plurality of threads, where each thread of the plurality of threads is configured to access an object in a lock-free mode based on an insertion of a declaration of a non-overwritable variable pointing to a current object in a source code and a storage of a value referencing the current object to the non-overwritable variable; and
by executing a first thread of the plurality of threads:
  locking a shared list;
  allocating the object;
  modifying a value of the object; and
  putting the object corresponding to the modified value at a head of the shared list.

7. The method of claim 6, further comprising releasing the lock of the shared list subsequent to put the object corresponding to the modified value at the head of the shared list.

8. The method of claim 7, further comprising, by executing a second thread of the plurality of threads:
  obtaining a second object from the shared list without a lock; and
  reading a field of the second object.

9. The method of claim 8, further comprising, by executing the second thread:
  determining that the read field of the second object does not match a target value; and
  responsive to determining that the read field of the second object does not match the target value, reading a second field of the second object to obtain a neighbor node.

10. The method of claim 8, further comprising, by executing the second thread:
  determining that the read field of the second object matches a target value; and
  finishing a search responsive to determining that the read field of the second object matches the target value.

11. A computer program product comprising a non-transitory computer readable storage medium having computer readable program code stored thereon that, when executed by a computer, performs a method, the method comprising:
executing, by at least one processor, a plurality of threads, where each thread of the plurality of threads is configured to access an object in a lock-free mode based on an insertion of a declaration of a non-overwritable variable pointing to a current object in a source code and a storage of a value referencing the current object to the non-overwritable variable; and
by executing a first thread of the plurality of threads:
  locking a shared list;
  allocating the object;
  modifying a value of the object; and
  putting the object corresponding to the modified value at a head of the shared list.

12. The computer program product of claim 11, wherein the method further comprises releasing the lock of the shared list subsequent to put the object corresponding to the modified value at the head of the shared list.

13. The computer program product of claim 12, wherein the method further comprises, by executing a second thread of the plurality of threads:
  obtaining a second object from the shared list without a lock; and
  reading a field of the second object.

14. The computer program product of claim 13, wherein the method further comprises, by executing the second thread:
  determining that the read field of the second object does not match a target value; and
  responsive to determining that the read field of the second object does not match the target value, reading a second field of the second object to obtain a neighbor node.

15. The computer program product of claim 13, wherein the method further comprises, by executing the second thread:
  determining that the read field of the second object matches a target value; and
  finishing a search responsive to determining that the read field of the second object matches the target value.

* * * * *